SEMICONDUCTOR CONTROLLED RECTIFIER HAVING A SHORTED EMITTER AT A PLURALITY OF POINTS

Filed April 1, 1964

WITNESSES

Theodore F. Wrobel

James F. Young

INVENTOR

Anthony Todaro, Jr.

BY Gordon H. Telfer

ATTORNEY 3,337,782

SEMICONDUCTOR CONTROLLED RECTIFIER HAVING A SHORTED EMITTER AT A PLURALITY OF POINTS

Anthony Todaro, Jr., Greensburg, Pa., assignor to Westinghouse Electric Corporation, East Pittsburgh, Pa., a corporation of Pennsylvania Filed Apr. 1, 1964, Ser. No. 356,513
9 Claims. (Cl. 317—235)

This invention relates generally to semiconductor devices and, more particularly, to semiconductor devices of the four region, three terminal type frequently known in the art as controlled rectifiers.

In copending application, Ser. No. 338,127, filed Jan. 16, 1964, by T. G. Stehney and assigned to the same assignee as the present invention, there are disclosed improved controlled rectifier structures wherein a portion of the junction between the emitter and base regions is shorted so as to reduce the injection efficiency of the emitter and permit good turn-off gain. Such devices have been found to have advantageous characteristics not only for purposes of turn-off by the application of a moderate control signal but also by reason of the fact that the breakover voltage of the device is relatively stable up to relatively high temperatures such as 150° C. and higher.

In accordance with the teachings of the copending application, which should be referred to for further information regarding this type of structure, controlled rectifiers have been made wherein the alloyed emitter region has an annular configuration, an ohmic gate contact to the adjacent base region is disposed within the opening of the annular emitter and the emitter is shorted around its entire outer periphery by a ring of metal in ohmic contact with the first base region and with the emitter contact.

Such a configuration has been found satisfactory in providing the above improvements in devices of sufficient size that the outer periphery of the emitter is sufficiently remote from the gate contact and the inner periphery of the emitter is sufficiently long so that the turn-on characteristics of the device are not appreciably affected by the short. Such is the case in devices having substantial area such as a wafer size of about ½ to ¾ inch diameter and the emitter alloy foil member has an inner diameter of about .120 inch and an outer diameter of about .400 inch.

However, in the fabrication of smaller controlled rectifiers, the short at the outer periphery of the emitter is closer to the gate contact and hence has more influence over it and also the inner periphery of the emitter is shorter so that it is frequently the case that turn-on of the device can only be effected by undesirably large control signals.

It is, therefore, an object of the present invention to provide an improved controlled rectifier structure having a shorted emitter that does not substantially affect the turn-on characteristics of the device even when the device is of small size.

Another object is to provide an improved controlled rectifier with a shorted emitter structure that may be readily fabricated in keeping with present fabrication techniques.

The above and other objects of the present invention are achieved by the provision of a semiconductor controlled rectifier wherein the junction formed by the emitter region with the adjacent base region to which an ohmic gate contact is attached is shorted at a plurality of positions by fused metal elements that are substantially enclosed by the emitter contact and alloyed in ohmic contact with the base region and with the emitter contact.

The structure is accordance with this invention permits complete control of the extent of emitter shorting by the possibility of varying the number of shorted positions of the emitter junction depending upon the size of the device, the impurity concentration within the emitter region and the desired device characteristics. Hence, this invention provides an emitter shorting configuration applicable to a wide variety of devices.

The size of the fused metal elements shorting the emitter periphery is not critical but for maximum control it is desirable that they be relatively small, at least only large enough to permit convenient handling in fabrication and therefore may have a diameter of from about 15 to 60 mils.

The number of fused metal elements may be varied as stated. It has been found, however, that adequate control of the characteristics of controlled rectifier devices is generally provided in accordance with this invention by utilizing from two to four fused metal elements that are substantially enclosed by the emitter contact. By the expression "substantially enclosed" is meant that the shorting elements have more than half their perimeter in direct contact with the emitter contact. This ensures easier and more accurate placement of the metal elements and more controllable device characteristics.

Devices in accordance with the present invention, and the above mentioned and additional objects and advantages thereof, will be better understood by referring to the following description together with the accompanying drawing wherein.

Figure 2:
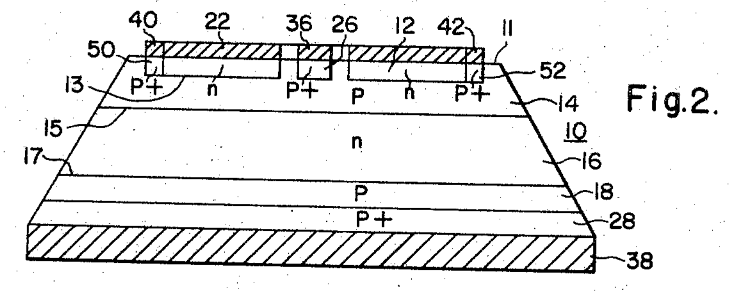
FIG. 2 is a sectional view of the device of FIG. 1 taken along the line II—II.
Figure 1:
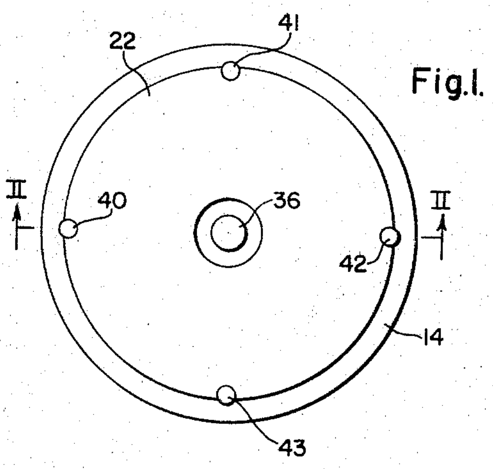
FIGURE 1 is a plan view of a semiconductor device in accordance with the present invention.

Referring to FIGS. 1 and 2, there is shown a semiconductive body 10 comprising four successive regions 12, 14, 16 and 18 of alternate semiconductivity type providing an npnp structure. Between contiguous regions, p-n junctions 13, 15 and 17 are formed. The four successive regions will sometimes be referred to hereinafter as the first emitter region 12, the first base region 14, the second base region 16 and the second emitter region 18. The n-type outer region 12 is also sometimes referred to as the cathode and the p-type outer region 18 is sometimes referred to as the anode.

Since it is necessary to make electrical contact to a base region, the first emitter region or cathode 12 occupies only a portion of the surface 11 of the first base region 14. On a portion of the surface 11 a means to make electrical contact to the base 14 is provided in the form of an alloyed ohmic contact forming a recrystallized p+ region 26 and a metallic contact 36 of eutectic alloy fused thereto.

Means to make electrical contact to the second emitter region or anode 18 is also provided in the form of an alloyed ohmic contact forming a recrystallized p+ region 28 and a metal contact 38 of eutectic alloy fused thereto.

The emitter region 12 is formed by the fusion of an alloy foil member having appropriate impurities therein so that the region 12 is formed of recrystallized semiconductive material with a fused contact 22 of eutectic alloy thereon.

In accordance with this invention, a portion of junction 13 between the first emitter 12 and first base 14 is shorted at a plurality of spaced positions by fused metal elements 40, 41, 42 and 43 disposed in indentations of the same shape in the first emitter and alloyed in ohmic contact with the first base region and with the edge of the emitter contact 22. Regions 50 and 52 of recrystallized p+ material are formed by metal elements 40 and 42, respectively. Similar regions, not shown, are formed by metal elements 41 and 43.

While for clarity in the drawing, the emitter contact 22 and the shorting means 40, 41, 42 and 43 are shown as distinct members, it is to be understood that as a result of the fusion process by which they are alloyed to the semiconductive body the material thereof flows together.

Devices as shown in FIGS. 1 and 2 have been fabricated. Typical devices have been made using as a starting material a wafer of n-type silicon having a resistivity that is substantially uniform and about 20 ohm-centimeters. The wafers were cut and lapped by conventional techniques to provide a thickness of about 9 mils and a major surface diameter of about 297 mils. A layer of the starting wafer having a thickness of about two mils was converted to p-type semiconductivity by diffusion of suitable acceptor impurities such as gallium or aluminum to a surface concentration of about $10^{18}$ atoms per cubic centimeter.

Alloy foil members are disposed on the diffused wafer including a member capable of imparting n-type semiconductivity when fused to the p-type surface layer so as to provide the emitter 12 of the device. The remaining alloy foil members are such as to make ohmic contact with the p-type surface layer such as for the gate contact 36, the second emitter contact 38 and the shorting elements 40, 41, 42 and 43.

The metal member for the n-type emitter 12 was of gold including about 0.1% by weight antimony. The emitter foil member has an inner diameter of about 125 mils and an outer diameter of about 250 mils and is shaped as a continuous annular disk. The p-type foil members were of gold including about 0.5% by weight boron. The foil member for the gate contact 36 had a diameter of about 95 mils. The indentations in the periphery of the emitter foil member were shaped by punching holes using a 32 mil minimum diameter punch. The metal elements fused within the indentations of the emitter conformed to the shape of the indentations. Upon fusion of the device and alloy foil members by heating to a temperature beyond the gold-silicon eutectic temperature and cooling, the n-type gold alloy formed recrystallized semiconductive region 12 with metal member 22 of eutectic alloy thereon while the p-type gold alloy formed recrystallized semiconductive regions 26, 28 and the regions under the fused shorting elements 40, 41, 42 and 43.

Subsequent fabrication was in accordance with prior technology including removal of the edges of the device including all of the diffused material thereon by scribing and etching to provide separate p-type regions 14 and 18. Conventional lead attachment and encapsulation were performed.

It is apparent that in the practice of this invention contact materials, diffused impurities, and semiconductive materials may be used other than those described in the examples herein. It is also to be noted that the semiconductivity type of the various regions may be reversed from that shown.

It has been found that devices in accordance with this invention made as described compare favorably with otherwise similar devices having either no short across the emitter junction or a shorting ring around the entire outer periphery of the emitter. Devices having no short generally have an adequately low forward voltage drop (typically about 1 v. to 1.5 v.) and low gate current and gate voltage (that is, the current and voltage required to turn-on the device). Gate voltage of about one volt and current of about 8 to 10 milliamperes are typical. However, the unshorted structure has undesirably poor stability of its breakover characteristic at elevated temperatures. Both structures with shorted emitters improve the temperature stability of the device so that the breakover characteristic remains relative stable up to about 150° C. The shorted structures also reduce the likelihood of turn-on by a rapid rate of rise of the applied forward blocking voltage, sometimes referred to as the *dv/dt* effect.

The structure having a shorting ring, or other configuration whereby a relatively large portion of the emitter junction is shorted, frequently does exhibit a greater forward voltage drop (typically about 2.5 v.), and higher gate current and gate voltage (typically about 50 ma. and 2 to 3 v., respectively). However, it has been found that the structure in accordance with this invention has a forward voltage drop and gate current and voltage very close to the values exhibited by the unshorted structure.

Figure 3:
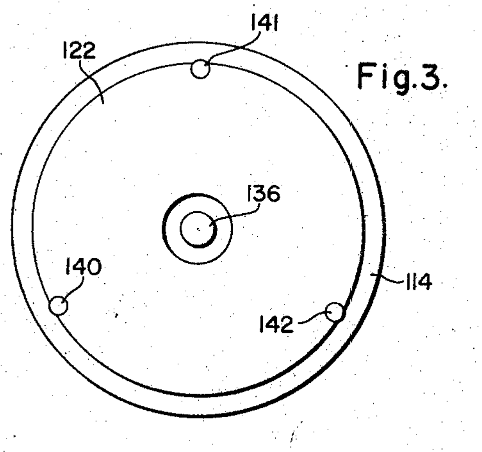
FIGS. 3, 4 and 5 are plan views of alternative embodiments of the present invention.

FIG. 3 illustrates an alternative embodiment wherein elements are indicated by reference numerals having the same last two digits as the corresponding elements of FIG. 1. FIG. 3 illustrates a device wherein the emitter junction periphery is shorted at only three positions by fused metal elements 140, 141 and 142 which lesser number of shorting positions may be desirable to short only as much of the junction as is necessary to achieve the desired characteristics and avoid an undesired increased in gate current and voltage.

It is to be understood that in the practice of this invention the number of positions at which the emitter junction periphery is shorted is a matter of choice for the device designer in accordance with the particular characteristics required from the device and the size and nature of the device itself. The number of shorting contacts does not cause difficulty in the fabrication process itself but as few shorting elements as possible is preferred for fabrication ease. It has been found that devices in accordance with this invention are advantageously fabricated having from two to four shorted positions on the emitter junction.

Figure 4:
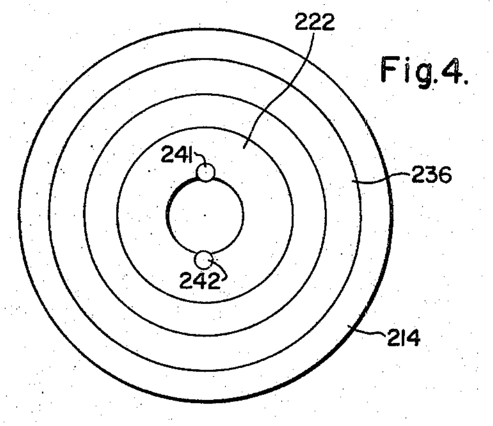

FIG. 4 illustrates another alternative embodiment wherein corresponding elements are designated with reference numerals having the same last two digits as those in FIG. 1. In the structure of FIG. 4 the arrangement of gate contact 236, emitter contact 222 and shorting members 241 and 242 are reversed from those illustrated in FIG. 1 so that the gate contact 236 surrounds the annular emitter 222 and the shorting means 241 and 242 are disposed within indentations in the inner periphery of the annular emitter. In the particular device illustrated, two shorting means 241 and 242 are shown however as with the case of the device of FIGS. 1 and 3 a number of shorting means, usually and preferably from two to four may be employed in the structure.

Figure 5:
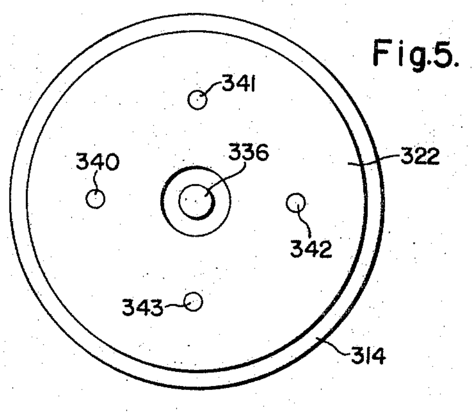

FIG. 5 illustrates a further alternative embodiment of the invention wherein the elements of the structure are designated with reference numerals having the same last two digits as those designating the corresponding elements of the structure of FIG. 1. In the structure of FIG. 5, the emitter contact 322 and gate contact 336 are generally as shown in FIG. 1. However, here the fused metal elements 340, 341, 342 and 343 that short the emitter junction are completely enclosed by the emitter contact 322. This configuration is preferred in some instances to provide even greater control over the emitter junction since each shorting element has influence only over a portion of the junction within a carrier diffusion length. This latter fact is also a reason for employing a plurality of shorting elements in a single device.

A feature of the invention, in addition to improvement of electrical characteristics, is that of facilitating fabrication. In each of the embodiments of this invention, the fused metal shorting elements are substantially enclosed by the emitter contact. That is, in embodiments such as those of FIGS. 1, 3 and 4, the indentations in the periphery of the emitter are at least half circles to ensure accurate placement of the shorting elements. In an embodiment such as that of FIG. 5 where circular openings in the emitter are provided, accurate placement of the shorting elements is even more ensured.

For convenience, circular shorting elements are employed since the required openings in the emitter contact can be readily provided by a circular punch. However, other shapes are satisfactory in the practice of the invention.

While the present invention has been shown and described in a few forms only it will be understood that various changes and modifications may be made without departing from the spirit and scope thereof.

What is claimed is:

1. A semiconductor controlled rectifier comprising: four successive semiconductive regions of alternate semiconductivity type with a p-n junction between each pair of contiguous regions; said regions including a first emitter region, a first base region, a second base region and a second emitter region; said first base region having a major surface with said first emitter region thereon; said first emitter region being of recrystallized semiconductive material having a metal contact fused thereto; a gate contact disposed on said major surface spaced from said first emitter region; conductive shorting means shorting said p-n junction between said first emitter region and said first base region at a plurality of spaced positions comprising fused metal elements substantially enclosed by said first emitter metal contact, said metal elements being alloyed in ohmic contact with said first base region and wtih said first emitter metal contact.

2. A semiconductor controlled rectifier in accordance with claim 1 wherein: said first emitter region has an annular configuration; said ohmic gate contact is disposed within and concentric with said first emitter region; and said conductive shorting means includes two to four of said fused metal elements disposed within identations in the outer periphery of said first emitter region.

3. A semiconductor controlled rectifier comprising: four successive semiconductive regions of alternate semiconductivity type with a p-n junction between each pair of contiguous regions; said regions including a first emitter region, a first base region, a second base region and a second emitter region; said first base region having a major surface with said first emitter region thereon; said first emitter region being of recrystallized semiconductive material having a metal contact fused thereto; a gate contact disposed on said major surface spaced from said first emitter region; conductive shorting means shorting said p-n junction between said first emitter region and said first base region at from two to four uniformly spaced positions at the periphery of said first emitter region; said shorting means comprising fused metal elements substantially enclosed within indentations in the periphery of said first emitter metal contact remote from said gate contact.

4. A semiconductor controlled rectifier comprising: four successive semiconductive regions of alternate semiconductivity type with a p-n junction between each pair of contiguous regions; said regions including a first emitter region, a first base region, a second base region and a second emitter region; said first base region having a major surface with said first emitter region thereon; said first emitter region being of recrystallized semiconductive material having a metal contact fused thereto; a gate contact disposed on said major surface spaced from said first emitter region; a plurality of spaced fused metal elements contacting both the metal contact of said first emitter region and the first region so as to selectively short the junction between said first emitter and first base regions to an extent determined by the number of said metal elements to achieve device characteristics including good temperature stability of the breakover voltage as well as good turn-on characteristics and low forward voltage drop; each of said fused metal elements being in contact on more than half of its perimeter with said metal contact of said first emitter region.

5. A semiconductor controlled rectifier in accordance with claim 4 wherein: said fused metal elements are disposed within indentations in the periphery of said metal contact to said first emitter.

6. A semiconductor controlled rectifier in accordance with claim 4 wherein: said fused metal elements are disposed within openings in said metal contact to said first emitter and are in direct contact at their entire perimeter with said metal contact.

7. A semiconductor controlled rectifier in accordance with claim 4 wherein: said fused metal elements number from two to four, have a circular configuration and are uniformly spaced.

8. A semiconductor device including at least a first region, a second region and a rectifying junction between said first and second regions, a first electrical contact on said second region; conductive means in electrical contact with both said first and second regions at a plurality of spaced positions to short said rectifying junction at the periphery thereof remote from said first electrical contact; an electrical contact on said first region at least substantially enclosing said conductive means.

9. A semiconductor device in accordance with claim 8 wherein said conductive means are from two to four fused metal elements.

References Cited

UNITED STATES PATENTS

| | | | |
|---|---|---|---|
| 3,239,728 | 3/1966 | Aldrich et al. | 317—235 |

FOREIGN PATENTS

| | | |
|---|---|---|
| 1,156,510 | 10/1963 | Germany. |
| 969,592 | 9/1964 | Great Britain. |

JOHN W. HUCKERT, *Primary Examiner.*

R. SANDLER, *Assistant Examiner.*